(12) United States Patent
Herrera Van Der Nood

(10) Patent No.: US 7,975,131 B2
(45) Date of Patent: Jul. 5, 2011

(54) PROCESSOR LOCK

(75) Inventor: José Manuel Herrera Van Der Nood, Hellevoetsluis (NL)

(73) Assignee: Koninklijke KPN N.V., The Hague (NL)

(*) Notice: Subject to any disclaimer, the term of this patent is extended or adjusted under 35 U.S.C. 154(b) by 242 days.

(21) Appl. No.: 12/086,811

(22) PCT Filed: Dec. 21, 2006

(86) PCT No.: PCT/EP2006/012387
§ 371 (c)(1),
(2), (4) Date: Jun. 19, 2008

(87) PCT Pub. No.: WO2007/071417
PCT Pub. Date: Jun. 28, 2007

(65) Prior Publication Data
US 2009/0037706 A1 Feb. 5, 2009

Related U.S. Application Data

(60) Provisional application No. 60/753,557, filed on Dec. 23, 2005.

(51) Int. Cl.
*G06F 9/30* (2006.01)
*G06F 9/44* (2006.01)
*G06F 12/14* (2006.01)
(52) U.S. Cl. .................. 712/229; 712/227; 726/21
(58) Field of Classification Search .................. 712/229, 712/227; 726/21
See application file for complete search history.

(56) References Cited

U.S. PATENT DOCUMENTS

| | | | |
|---|---|---|---|
| 5,740,461 A | 4/1998 | Jaggar | 395/800 |
| 6,093,213 A | 7/2000 | Favor et al. | 703/27 |
| 6,499,123 B1 | 12/2002 | McFarland et al. | 714/725 |
| 2002/0099959 A1* | 7/2002 | Redlich et al. | 713/201 |
| 2002/0169632 A1* | 11/2002 | Grossman | 705/1 |
| 2003/0195950 A1* | 10/2003 | Huang et al. | 709/219 |
| 2004/0044904 A1* | 3/2004 | Yamazaki et al. | 713/200 |
| 2005/0091474 A1 | 4/2005 | Wojewoda et al. | |

FOREIGN PATENT DOCUMENTS

EP   1 443 394   8/2004

* cited by examiner

*Primary Examiner* — Daniel Pan
(74) *Attorney, Agent, or Firm* — Michaelson & Associates; Peter L. Michaelson

(57) ABSTRACT

A processor having multiple distinct instruction sets is disclosed where one set, a default set, is always available for execution while a second set is only available once a valid control code is externally supplied to the processor to effectively "unlock" and enable the second set. Once the second set is so unlocked, then the instructions in both sets are available for subsequent execution by the processor to provide enhanced functionality only available through use of the second set, such as accessing on-line services and content information. Multiple unlockable instruction sets can also be similarly provided, each being separately unlocked and enabled through entry of an corresponding externally supplied control code.

16 Claims, 1 Drawing Sheet

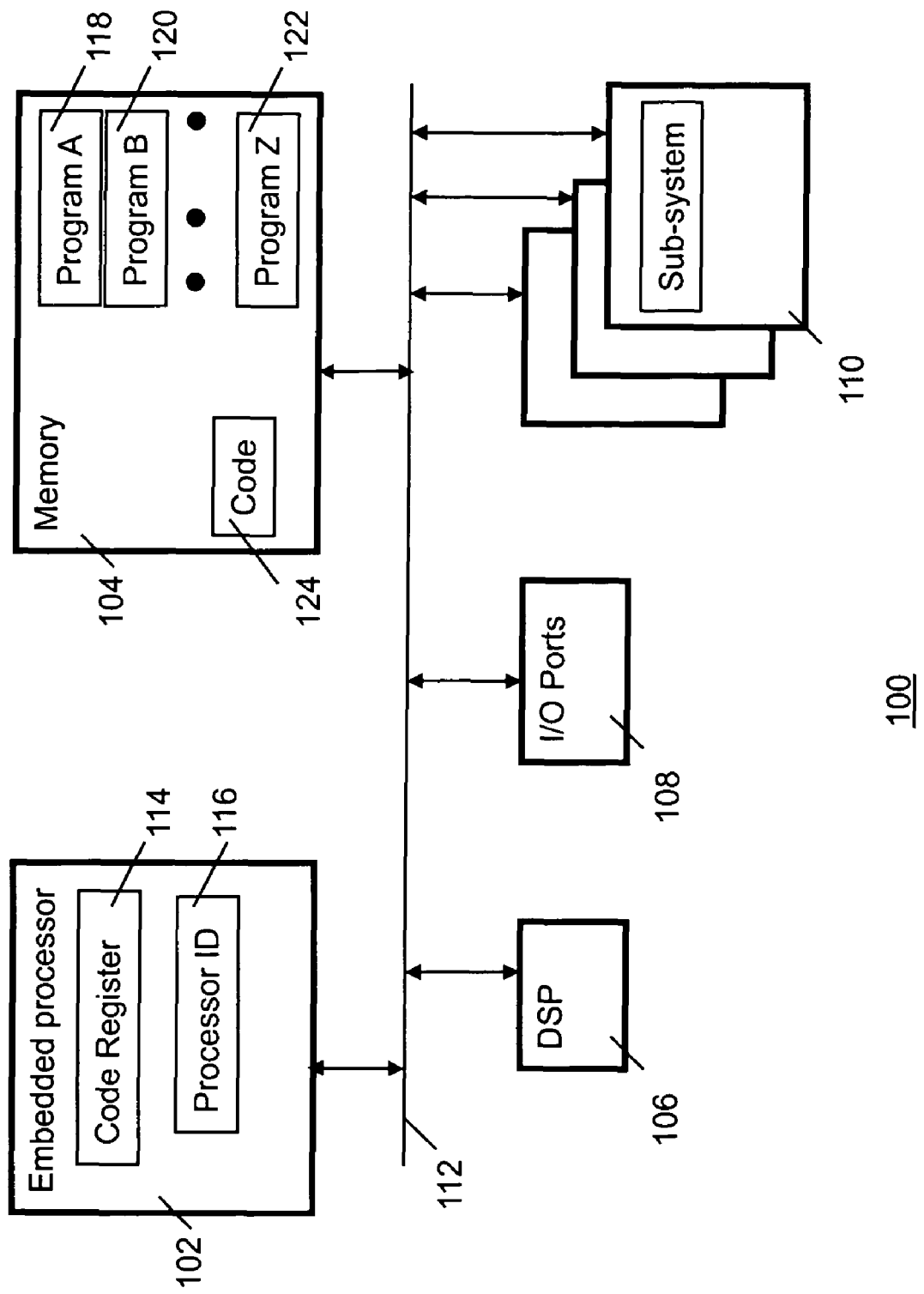

PROCESSOR LOCK

PRIORITY APPLICATION

This application claims the benefit of U.S. Provisional Application No. 60/753,557, filed Dec. 23, 2005, as a result of the Applicant's international patent application PCT/EP2006/012387, filed on Dec. 21, 2006 of which the present application is a U.S. counterpart application.

FIELD OF THE INVENTION

The invention relates to a data processing system comprising an embedded processor.

BACKGROUND ART

Embedded processors in end-user devices are commonly known. Within this context, an embedded processor is a special-purpose microprocessor embedded in the device it controls. In contrast to a general-purpose processor, such as those for use in a personal computer (PC), an embedded processor performs a limited number of pre-defined tasks, typically with very specific requirements and a specific instruction set. Since the processor is dedicated to specific tasks, design engineers can optimize it, reducing its size and cost. An end-user device within this context is an electronic device whose main functionality is intended for everyday use by the end-user, typically a consumer. Examples of user devices are a mobile telephone, another personal communication device, a navigational aid, an ADSL modem, etc.

Typical examples of such processors are the DSTni-LX/DSTni-EX embedded processors from Lantronix, the NS7520 Microprocessor from Netsilicon, the ADSP-21xx Processor and Blackfin Processors from Analog Devices.

Other examples are the processors with an x86-compatible CPU of the 80286 series. These processors have an operational mode referred to as the "protected mode" that serves to limit access by a software program to certain processor instructions and addressable memory areas, to the discretion of the developer of that program. That is, the conditions for limited access are set during programming. For more background see, e.g., "Overview of the Protected Mode Operation of the Intel Architecture", author Steve Gorman, a white paper published by Intel Corporation.

SUMMARY OF THE INVENTION

There has been a large increase in the number of commercially available data processing systems, such as user devices, based on embedded processors, for accessing online services and content information. Some online services and content information need to be protected from unauthorized access. That is, the user should only have access to these services or this content, if certain conditions have been met, such as the condition that a subscription fee has been paid in advance, or the condition that one has been granted permission by the relevant authority.

A drawback of the processors having the aforesaid protected mode is that this functionality cannot be controlled or restricted by an external agent. Once the functionality has been determined by the programmer, it cannot be restricted or otherwise controlled by the system on which it is running.

It is an object of the invention to mitigate above and other drawbacks and to provide control over a data processing system via the embedded processor from outside the system and in operational use of the system. This control can be used in combination with, e.g., a payment system or a subscription system, to enable or disable certain functionality of the data processing system via the embedded processor. The inventor therefore proposes to equip the embedded processor with control capabilities in at least two operational modes of the processor. One mode serves as a basic or default mode, wherein a limited part of the total functionality of the system can be activated through a specific instruction set of the embedded processor. The total functionality is represented by the set of software programs available in the system that can be used running associated instruction sets. The additional functionalities (i.e., the set of programs representing the logical complement of the default functionality) are made available, as a whole or partly, only when associated control codes are supplied to the processor for entering further operational modes by means of using further instruction sets that are blocked in the default mode. This supply is achieved by, e.g., a user program that is downloaded from a server or content provider to the processor, or by the user via a user interface on the user device. The control codes serve to unlock the use of the instructions that are locked in the default mode.

More specifically, the invention relates to a data processing system comprising an embedded processor. The processor has a first operational mode, wherein the processor is operative to make available a first functionality of the system under control of the processor using a first set of instructions. The processor has a second operational mode, wherein the processor is operative to make available a second functionality of the system under control of the processor using a second set of instructions, different from the first set. The processor is operative to unconditionally enter the first operational mode. The processor is operative to conditionally enter the second operational mode dependent on a control code being supplied from a source, at least partly external to the system, to the processor so as to enable (or disable) the processor to access the second set of instructions.

Accordingly, some instructions or instruction sets (machine code) are only conditionally available to the processor. The total set of instructions available to the processor determines its architecture. The instruction set determines the options that can be invoked via the compiled program code. The program code resides in the system memory. Part of the program code cannot be executed if the processor cannot execute the relevant instructions invoked by the program code, as a result of the relevant instructions being blocked. The control code then unlocks these instructions, thus enabling the program code to invoke these instructions.

For example, among the X86 codes the "set interrupt flag" instruction could be made a conditionally available instruction. As another example, the control of the I/O ports could be made conditionally available, whether these ports are local to the processor itself or form part of the system external to the processor. In the latter case the processor controls the ports via control signals, see, e.g., the architecture of the 9800 processor. As yet another example, the address range could be extended conditionally. A small range could be made available in the processor's default mode. Upon a proper code having been supplied larger software programs can be read and executed.

In an embodiment of the invention, the processor has a plurality of further operational modes. In a respective one of the further operational modes, the processor is operative to make available a respective one of a plurality of further functionalities of the system under control of the processor using a respective one of a plurality of different sets of instructions. The processor is operative to conditionally enter the respective one of the further operational modes, dependent on a respective one of a plurality of control codes being supplied from the source to the processor so as to enable (or disable) the processor to access the respective one of the plurality of further set of instructions.

Accordingly, the processor is equipped with a complete collection of instructions, some of which can be selectively blocked or released for operational use of the processor in order to implement certain system functionality.

Preferably, the processor has a unique identifier. The processor is then operative to conditionally enter the further operational mode dependent on the control code forming a match with the identifier. In addition, the control code is received in an encrypted format using the identifier to encrypt the control code.

The source comprises, e.g., a user interface for enabling a user to enter the control code, or a connection to a data network for enabling the processor to receive the control code via the data network.

The further functionality comprises at least one of the following: enabling video conferencing via the system; via the system receiving content information from a service provider via a data network; via the system playing out content information streamed over the data network.

The system of the invention is preferably accommodated in a physical device, e.g., a mobile telephone, or a personal digital assistant or a navigational aid.

BRIEF DESCRIPTION OF THE DRAWING

The invention is explained in further detail, by way of example and with reference to the accompanying drawing, wherein FIG. 1 is a diagram illustrating an architecture of a system of the invention.

DETAILED EMBODIMENTS

For the purpose of teaching of the invention, preferred embodiments of the devices of the invention are described in the sequel. It will be apparent to the person skilled in the art that other alternative and equivalent embodiments of the invention can be conceived and reduced to practice without departing from the true spirit of the invention, the scope of the invention being limited only by the appended.

FIG. 1 is a block diagram of a data processing system 100 in the invention. System 100 comprises an embedded processor 102, system memory 104, one or more digital signal processors (DSPs) 106, I/O ports 108 and other data processing sub-systems 110, all connected to a system bus 112. As known, system memory 104 is the memory used by the operating system. Embedded processor 102 is designed for carrying out pre-determined instructions. Different functionalities of system 100 require the processor to run different instructions (i.e., different machine codes). Embedded processor 102 has a code register 114 and a processor identifier (ID) register 116. Memory 104 stores a plurality of programs 118, 120, ..., 122. System 100 is preferably accommodated in a single physical electronic device or apparatus.

System 100 provides several functionalities under control of embedded processor 102 being in a specific one of multiple operational modes. The operational modes comprise, for example, a basic mode and at least an advanced mode.

In the basic mode, system 100 is restricted to a limited set of functionality as a result of processor 102 being restricted to a limited set of instructions. One or more of programs 118-122 are representative of this limited set of functionality. The limited functionality can be implemented, for example, by way of excluding part of the total instruction set of processor 102 from operational use; inhibiting operation of a part of I/O ports 108 by means of I/O controls via bus 112; exclusion of part of the user-addressable area in memory (for the programs themselves); exclusion of a part of the memory-mapped I/O area (as an alternative to I/O ports, some processors use memory-mapped I/O as a basis or as an option); inhibiting operation of a part of the direct memory access (DMA) channels; blocking access to DSP 106 or of one or more of sub-systems 110, etc. The functionality that remains available is a minimum instruction set required for, e.g., powering-on system 100, configuring basic services and connecting to an external service provider.

More advanced functionality is only made available if the associated one(s) of programs 118-122, which are stored in memory 104 and which require the underlying processor functionality, are enabled to use the related part of the instruction set of processor 102, to access the related I/O ports, memory addresses and DMA channels. This more advanced functionality of system 100 includes, e.g., playing of multimedia content, video conferencing, voice and data services, running of speech codecs or video codecs, connecting to other devices or peripherals or connecting to a home network.

In order to be able to use the advanced functionality of system 100, a control code is to be supplied to processor 102. For this purpose, processor comprises register 114 in which the code can be entered via a special program, or a memory location 124 that has been assigned to storing the code received and that can be read by processor 102. The code is to be entered into system 100 from a source outside system 100. This can be accomplished through, e.g., connecting via one of I/O ports to a service provider over the Internet, or by the user manually entering the relevant code via a user interface (not shown) of system 100 through a system routine for manual input or through a user program.

The code selectively enables or disables the use of part of the complete instruction set of processor 102.

The control code is preferably related to the identity of processor 102 and/or to the identity of system 100 so as to provide an extra security. If the control code then does not match the identity, processor 102 does not change its operational mode. If a matching code is entered, the processor enables the associated functionality by means of using the instruction set(s) released for operational use by the correct matching code. Preferably, the control code is checked in combination with a unique identifier (ID) of the processor, such as the processor's unique serial number stored in register 116. Only if the control code matches the unique ID, the related functionality of system 100 becomes available. After system 100 has been turned off and then is turned on again, processor 102 enters the default (locked) mode again. The control code or a new control code needs to be entered again to unlock processor 102 so that it can use the additional instructions that were locked in the default mode.

A more secure way of operation is achieved by encrypting the control code and limiting the time period of its validity. The expression "time period" covers the concept of a time span, and the concept of a number of times it has been in operational use. Encryption is achieved by using the unique ID of processor 102 as a shared secret between the service provider and processor 102, and using this secret to encrypt the control code. Processor 102 will decrypt the control code and perform the check in combination with the unique ID in register 116. The functionality associated with the control code can now be activated in a more secure way, and the validity time period or number of tines the code has been used, is being monitored by processor 102. When the validity period expires, preferably only the basic functionality of system 100 will remain available and a new control code needs to be supplied to processor 102 in order to activate additional functionality again. This provides the important advantage that the user needs to request a new control code from his/her service provider, which increases the amount of control exercised on the service provided and on the content usage by the users of system 100.

The invention claimed is:

1. A data processing system comprising an embedded processor, the system having:
   the processor, wherein the processor has a native instruction set, the instruction set having first and second unique sets of different instructions; and
   internal circuitry, situated within the processor, to enable the processor to execute any instruction within the second set of instructions;
   such that, in response to the circuitry, the processor exhibits:
      a first operational mode through which the processor unconditionally provides, as a default mode, a first functionality to the system by only using the first set of instructions, wherein during the first operational mode the circuitry prevents the processor from executing any of the instructions in the second set of instructions; and
      a second operational mode, wherein the processor conditionally provides a second functionality to the system by using both the first and second sets of instructions, the processor assumes the second operational mode in response to a predefined control code being supplied to the processor, from a source external to the processor, such that the circuitry, acting in response to the code, enables the processor to execute any of the instructions in the second set of instructions as a result of which the processor is then able to execute any instruction in both the first and second sets of instructions.

2. The system of claim 1 wherein the source comprises a user interface for enabling a user to enter the control code.

3. The system of claim 1 wherein the source comprises a connection to a data network for enabling the processor to receive the control code via the data network.

4. The system of claim 1 wherein:
   the processor has a plurality of further operational modes;
   in a respective one of the further operational modes, the processor makes available a respective one of a plurality of further functionalities of the system under control of the processor using a respective one of a plurality of different sets of instructions; and
   the processor conditionally enters the respective one of the further operational modes in response to a corresponding one of a plurality of control codes being supplied from the source to the processor such that the circuitry, acting in response to said corresponding one control code, enables the processor to execute any of the instructions in the respective one set of instructions.

5. The system of claim 1 wherein the processor has a unique identifier and the processor conditionally enters the one further operational mode in response to the processor having detected that the control code matches the identifier.

6. The system of claim 5 wherein the control code, as received by the processor, is encrypted using the identifier.

7. The system of claim 1 wherein the further functionality comprises at least one of the following:
   enabling video conferencing via the system;
   receiving, via the system, content information from a service provider via a data network; and
   playing, via the system, content information streamed over the data network.

8. A data processing system for accessing online services and content information, the system having an embedded processor, wherein:
   the processor has a first operational mode and provides a first functionality of the system through use of a first set of instructions native to the processor; and
   the processor has a second operational mode and provides a second functionality of the system through use of a second set of instructions native to the processor, the second set being different from the first set of instructions; and
   wherein:
      the processor is operative to unconditionally enter the first operational mode; and
      the processor is operative to conditionally enter the second operational mode in response to a control code being supplied from a source, external to the system, the control code representing authorization of a user of the system to use the second functionality to access the online services and content information.

9. The system of claim 8 wherein the system is accommodated in a physical device.

10. The system of claim 9, wherein the device comprises a mobile telephone.

11. The system of claim 8 wherein:
   the processor has a plurality of further operational modes;
   in a respective one of the further operational modes, the processor makes available a respective one of a plurality of further functionalities of the system under control of the processor using a respective one of a plurality of different sets of instructions; and
   the processor conditionally enters the respective one of the further operational modes in response to a respective one of a plurality of control codes being supplied from the source to the processor.

12. The system of claim 8 wherein the processor has a unique identifier and the processor conditionally enters the further operational mode in response to the processor having detected that the control code matches the identifier.

13. The system of claim 12 wherein the control code, as received by the processor, is encrypted using the identifier.

14. The system of claim 8 wherein the source comprises a user interface for enabling a user to enter the control code.

15. The system of claim 8 wherein the source comprises a connection to a data network for enabling the processor to receive the control code via the data network.

16. The system of claim 8 wherein the further functionality comprises at least one of the following:
   enabling video conferencing via the system;
   receiving, via the system, content information from a service provider via a data network; and
   playing, via the system, content information streamed over the data network.

* * * * *